US011508386B2

United States Patent
Park et al.

(10) Patent No.: US 11,508,386 B2
(45) Date of Patent: Nov. 22, 2022

(54) AUDIO CODING METHOD BASED ON SPECTRAL RECOVERY SCHEME

(71) Applicants: Electronics and Telecommunications Research Institute, Daejeon (KR); Kwangwoon University Industry-Academic Collaboration Foundation, Seoul (KR)

(72) Inventors: Hochong Park, Seongnam-si (KR); Seung Kwon Beack, Daejeon (KR); Jongmo Sung, Daejeon (KR); Seong-Hyeon Shin, Seoul (KR); Mi Suk Lee, Daejeon (KR); Tae Jin Lee, Daejeon (KR); Jin Soo Choi, Daejeon (KR)

(73) Assignees: Electronics and Telecommunications Research Institute, Daejeon (KR); Kwangwoon University Industry-Academic Collaboration Foundation, Seoul (KR)

( * ) Notice: Subject to any disclaimer, the term of this patent is extended or adjusted under 35 U.S.C. 154(b) by 309 days.

(21) Appl. No.: 16/843,649

(22) Filed: Apr. 8, 2020

(65) Prior Publication Data

US 2020/0349959 A1    Nov. 5, 2020

(30) Foreign Application Priority Data

May 3, 2019   (KR) .................. 10-2019-0052560

(51) Int. Cl.
  *G10L 25/00* (2013.01)
  *G10L 19/032* (2013.01)
  (Continued)

(52) U.S. Cl.
  CPC .............. *G10L 19/032* (2013.01); *G06N 3/08* (2013.01); *G06N 20/00* (2019.01); *G10L 25/18* (2013.01); *G10L 25/21* (2013.01)

(58) Field of Classification Search
  CPC ....... G10L 19/032; G10L 25/18; G10L 25/21; G10L 19/0017; G10L 19/0212;
  (Continued)

(56) References Cited

U.S. PATENT DOCUMENTS 9,135,929 B2    9/2015  Mundt et al.
10,388,293 B2 *  8/2019  Sung ................... G10L 19/0204
  (Continued)

OTHER PUBLICATIONS

Gu et al., "Waveform Modeling Using Stacked Dilated Convolutional Neural Networks for Speech Bandwidth Extension." Interspeech. 2017 (Year: 2017).*

(Continued)

*Primary Examiner* — Edgar X Guerra-Erazo
*Assistant Examiner* — Philip H Lam
(74) *Attorney, Agent, or Firm* — William Park & Associates Ltd.

(57) ABSTRACT

An inventive concept relates to an audio coding method to which CNN-based frequency spectrum recovery is applied. An inventive concept transmits a part of frequency spectral coefficients generated in transform coding to a decoder and the decoder recovers the frequency spectral coefficient not transmitted. Furthermore, the signs of frequency spectral coefficient are transmitted from an encoder to the decoder depending on a sign transmission rule.

13 Claims, 7 Drawing Sheets

(51) Int. Cl.
*G10L 25/18* (2013.01)
*G06N 20/00* (2019.01)
*G06N 3/08* (2006.01)
*G10L 25/21* (2013.01)

(58) Field of Classification Search
CPC ........... G10L 25/30; G10L 19/06; G06N 3/08; G06N 20/00; G06N 3/0454
See application file for complete search history.

(56) References Cited

U.S. PATENT DOCUMENTS

| | | | |
|---|---|---|---|
| 2008/0027715 A1* | 1/2008 | Rajendran | G10L 19/06 |
| | | | 704/E19.044 |
| 2009/0171671 A1 | 7/2009 | Seo et al. | |
| 2009/0232204 A1* | 9/2009 | Lee | H04N 19/146 |
| | | | 375/E7.076 |
| 2011/0164677 A1* | 7/2011 | Lu | H04N 19/147 |
| | | | 375/E7.126 |
| 2011/0191111 A1* | 8/2011 | Chu | G10L 19/005 |
| | | | 704/500 |
| 2014/0236581 A1* | 8/2014 | Lee | G10L 19/032 |
| | | | 704/203 |
| 2016/0260426 A1 | 9/2016 | Kim et al. | |
| 2018/0286425 A1 | 10/2018 | Baek et al. | |
| 2019/0149821 A1* | 5/2019 | Moon | H04N 19/70 |
| | | | 375/240.02 |
| 2020/0404257 A1* | 12/2020 | Filippov | H04N 19/184 |

OTHER PUBLICATIONS

Martin Dietz et al., "Spectral Band Replication, a novel approach in audio coding", Audio Engineering Society Convention Paper 5553, May 10-13, 2002, pp. 1-8, AES 112th Convention, Munich, Germany.

Seong-Hyeon Shin et al., "Audio Coding Based on Spectral Recovery by Convolutional Neural Network", ICASSP 2019—2019 IEEE International Conference on Acoustics, Speech and Signal Processing (ICASSP), May 12-17, 2019, IEEE, Brighton, United Kingdom.

* cited by examiner

|  | Layer | Output shape | No. of filters | filter size | Stride |
|---|---|---|---|---|---|
| Encoding network | 1 | [152, 8] | 32 | [5, 5] | [2, 1] |
|  | 2 | [152, 4] | 64 | [5, 5] | [1, 2] |
|  | 3 | [76, 4] | 128 | [5, 5] | [2, 1] |
|  | 4 | [76, 2] | 256 | [5, 5] | [1, 2] |
|  | 5 | [38, 2] | 512 | [5, 5] | [2, 1] |
| Decoding network | 1 | [76, 2] | 256 | [5, 3] | [2, 1] |
|  | 2 | [152, 2] | 128 | [5, 3] | [2, 1] |
|  | 3 | [304, 2] | 64 | [5, 3] | [2, 1] |
|  | 4 | [608, 2] | 32 | [5, 3] | [2, 1] |
|  | 5 | [608, 2] | 1 | [5, 3] | [1, 1] |

|  |  | Bit rate (kbps) | | Reduction rate (%) |
|---|---|---|---|---|
|  |  | ACSR | USAC |  |
| MDCT coeffs. | $Q_0$ | 32.4 | 42.6 | 20.4 |
|  | Signs in R | 1.5 |  |  |
| Side information |  | 5.5 | 5.4 | — |
| Total |  | 39.4 | 48.1 | 18.1 |

FIG. 7

AUDIO CODING METHOD BASED ON SPECTRAL RECOVERY SCHEME

CROSS-REFERENCE TO RELATED APPLICATION(S)

This application claims the priority benefit of Korean Patent Application No. 10-2019-0052560 filed on May 3, 2019, in the Korean Intellectual Property Office, the disclosure of which is incorporated herein by reference for all purposes.

BACKGROUND

1. Field

Example embodiments relate to a method for processing audio signals, and more particularly, to a scheme for coding or decoding audio depending on a frequency recovery scheme.

2. Description of Related Art

Transform coding is one of the most important schemes in processing audio signals. The transform coding may quantize the frequency spectral coefficients based on a human psycho-acoustic model. Furthermore, the transform coding is generally used for high quality coding at high bit-rate, by recovering an output waveform with sound quality proportional to the bit-rate in coding processing.

Parametric coding has been developed to solve the problem of the conventional transform coding at low bit-rate. The parametric coding may determine several parameters, each of which indicates audio information in a parametric domain and which are used to generate sound perception similar to the original sound.

For low bit-rate coding, the parametric coding is much more efficient than the transform coding by processing parameterized frequency spectral information instead of individual coefficients. However, the parametric coding is very restricted in performing high quality coding. The reason is that it is impossible to reconstruct the sophisticated frequency spectral structure required to generate a high quality waveform using only the given parameters as long as the original frequency spectrum is lost.

Frequency spectrum recoveries for voice/audio signals may be performed based on the conventional neural network. Most methods deal with block-based recovery. However, the blocks in the high-frequency band are recovered based on the low-frequency band. Even though additional parameters for aiding accurate recovery in the coding in a parametric high-frequency band are provided, the performance of block-based frequency spectrum recovery is lower than that of the transform coding.

Therefore, there is a need for a method for improving the performance of the transform coding at high bit-rate.

SUMMARY

An aspect provides a method capable of coding audio signals with a better quality than the conventional audio coding scheme at the same bit-rate.

According to an aspect, a coding method of a frequency spectrum recovery scheme performed by an encoder includes performing transform coding on an input signal, identifying a frequency spectral coefficient in a 2D check pattern derived through the transform coding, determining a first frequency spectral coefficient for a current frame to be transmitted to a decoder and a second frequency spectral coefficient for the current frame determined as not being transmitted to the decoder, among frequency spectral coefficients in the 2D check pattern, coding the first frequency spectral coefficient to be transmitted to the decoder to transmit the coded first frequency spectral coefficient to the decoder, and selectively transmitting a sign of the second frequency spectral coefficient, which is determined as not being transmitted to the decoder, to the decoder.

The coding method further includes determining energy distribution information of a frequency spectral coefficient of the current frame and determining a reference frequency to which the coding method of the frequency spectrum recovery scheme is applied, using the energy distribution information.

The sign of the second frequency spectral coefficient is sorted depending on importance of the sign to be selectively transmitted to the decoder.

The first frequency spectral coefficient is quantized and encoded through arithmetic coding, and both a magnitude and a sign are transmitted to the decoder.

According to an aspect, a decoding method of a frequency spectrum recovery scheme performed by a decoder includes decoding a first frequency spectral coefficient transmitted from an encoder, recovering a magnitude of a second frequency spectral coefficient through a neural network, determining a sign transmission rule of a second frequency spectral coefficient, which is not transmitted by the encoder, allocating a sign of the second frequency spectral coefficient depending on the sign transmission rule, and performing inverse transform coding on the first frequency spectral coefficient and a second frequency spectrum, of which the sign and the magnitude are determined, to output a recovered input signal.

The first frequency spectral coefficient is a frequency spectrum transmitted to the decoder, among frequency spectral coefficients in a 2D check pattern derived by performing transform coding on an input signal in the encoder. The second frequency spectral coefficient is a frequency spectrum not transmitted to the decoder, among the frequency spectral coefficients in the 2D check pattern derived by performing the transform coding on the input signal in the encoder.

The sign of the second frequency spectral coefficient is sorted depending on importance of the sign to be selectively transmitted by the encoder. The allocating of the sign includes allocating the transmitted sign to the second frequency spectral coefficient and allocating the sign, which is not transmitted, to the second frequency spectral coefficient randomly.

The decoding of the first frequency spectral coefficient includes decoding the first frequency spectral coefficient based on arithmetic decoding.

The neural network is trained by receiving a frequency spectral coefficient, in which a frequency index is reduced, in a 2D check pattern of a time-frequency domain.

An input of the neural network is a result of deleting elements lower than a reference frequency among elements of a union of a first frequency index coefficient for a current frame, which is transmitted to the decoder in the 2D check pattern of the time-frequency domain, and a frequency index coefficient of a past frame.

According to an aspect, an encoder performing a coding method of a frequency spectrum recovery scheme includes a processor. The processor is configured to perform transform coding on an input signal, to identify a frequency spectral coefficient in a 2D check pattern derived through the transform coding, to determine a first frequency spectral coefficient for a current frame to be transmitted to a decoder and a second frequency spectral coefficient for the current frame determined as not being transmitted to the decoder, among frequency spectral coefficients in the 2D check pattern, to encode the first frequency spectral coefficient to be transmitted to the decoder to transmit the coded first frequency spectral coefficient to the decoder, and to selectively transmit a sign of the second frequency spectral coefficient, which is determined as not being transmitted to the decoder, to the decoder.

According to an aspect, a decoder performing a decoding method of a frequency spectrum recovery scheme includes a processor. The processor is configured to decode a first frequency spectral coefficient transmitted from an encoder, to recover a magnitude of a second frequency spectral coefficient through a neural network, to determine a sign transmission rule of a second frequency spectral coefficient, which is not transmitted by the encoder, to allocate a sign of the second frequency spectral coefficient depending on the sign transmission rule, and to perform inverse transform coding on the first frequency spectral coefficient and a second frequency spectrum, of which the sign and the magnitude are determined, to output a recovered input signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, a description will be given in detail for exemplary embodiments of the inventive concept with reference to the following drawings.

Figure 1:
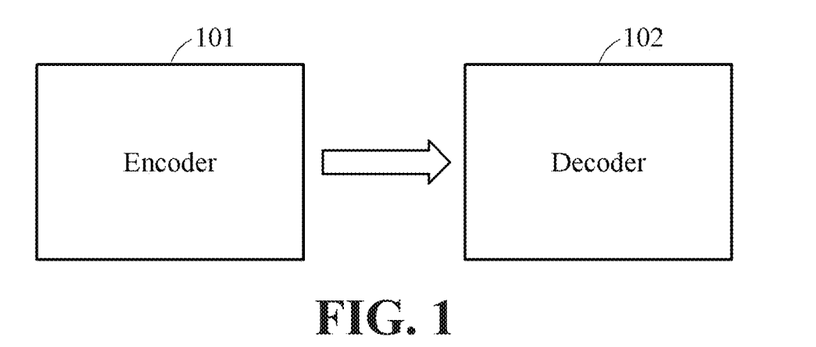
FIG. 1 is a block diagram illustrating an encoder and a decoder according to an example embodiment of the inventive concept.

FIG. 1 is a block diagram illustrating an encoder and a decoder according to an example embodiment of the inventive concept.

The inventive concept relates to a method for improving the performance of transform coding at high bit-rate. The inventive concept is based on frequency spectrum recovery by a neural network. The frequency spectral information of the input signal is represented in the 2D time-frequency domain after the transformation is applied to the subframe. A part of the frequency spectral coefficients selected in a 2D check pattern is quantized and coded by general transform coding in the coding region. Additionally, only the several important signs in the missing frequency spectral coefficients are transmitted.

In the coding region, the magnitudes of the missing frequency spectral coefficients are recovered based on randomly allocated signs depending on the importance of the data and signs transmitted by the convolution neural network (CNN). The inventive concept utilizes both transmission and recovery of frequency spectral information, thereby reducing quantization error in transmitting reduced data. Accordingly, it is possible to improve coding efficiency.

Unlike block-based recovery, the inventive concept independently recovers individual frequency spectral coefficients based on neighbor information. The reason is that the data to be recovered is arranged in a 2D check pattern. Accordingly, in the case of the inventive concept, the frequency spectrum recovery may provide the performance better than the block-based recovery; the coding scheme to which the frequency spectrum recovery is applied may become a new transform coding scheme supporting potential performance improvement.

The most important aspect of the inventive concept is to transmit only the part of frequency spectral coefficients from a coding region to a decoding region. Then, the decoder may recover missing frequency spectral coefficients that were not transmitted. This process may proceed because there is a strong correlation between frequency spectral coefficients. However, the coding of the frequency spectral coefficients indicates a very weak correlation with each other.

In the inventive concept, only the magnitude of the frequency spectral coefficient is recovered, and the sign of the frequency spectral coefficient is processed individually. In the inventive concept, the subframe-based transformation is applied to increase the correlation of data. As a result, the frequency spectral coefficients are represented in the 2D time-frequency domain; the frequency spectrum recovery may use data correlation in time and frequency spectrum.

For example, in the inventive concept, it is assumed that the length of the frame is 2048 samples and the length of the subframe is 1024 samples. Modified discrete cosine transform (MDCT) is applied to each subframe with the overlap of 50%. The MDCT coefficients are represented by the matrix of the size of 1024×2 defined as X[k] [m] in the time-frequency domain for each frame. That is, the matrix described in the inventive concept represents a frequency spectral coefficient derived from an input signal through the transform coding. For example, the MDCT may be applied to the transform coding, but the inventive concept is not limited thereto. Herein, 'k' denotes a frequency index of $0 \leq k \leq 1024$, and 'm' denotes a subframe index. When 'm' is 0 or 1, 'm' denotes the current subframe; when 'm'$\leq -1$, 'm' denotes the past subframe.

Because the human perception in the low-frequency band is very sensitive despite the distortion of the low-frequency spectrum, it may not be easy to achieve the accuracy required by frequency spectrum recovery in the low-frequency band. Accordingly, it is assumed that the inventive concept is applied to the high-frequency band of $L_x$ Hz or more. Herein, frequency index 'k' may be $k_L$. Moreover, general transform coding may be applied in the lower frequency band rather than $L_x$ Hz. $L_x$ indicates a reference frequency to which the frequency spectrum recovery scheme is applied.

The magnitudes of MDCT coefficients in the frequency band of 3 kHz to 4 kHz or less require the quality level more than the accuracy of the frequency spectrum recovery. Accordingly, $L_x$ that varies for each frame around 3 kHz to 4 kHz may be applied. Additionally, energy distribution information helps to determine the proper $L_x$. Then, the encoder calculate the energy $EN_{low}$ of 4 kHz or less and the energy $EN_{high}$ more than 4 kHz, which is a specific frequency, using the matrix X[k][0] and X[k][1], which correspond to the current frame. Afterward, the encoder may calculate "$EN_{ratio}=(EN_{low}/EN_{high})$".

Then, when frames having $EN_{ratio}$ are greater than a fixed threshold value, $L_x$ may be set to 4 kHz, which is a specific frequency; when the frames having $EN_{ratio}$ are lower than the fixed threshold value, $L_x$ may be set to 3 kHz. For example, when $L_x$ is 3 kHz and $L_x$ is 4 kHz, the selection ratio indicates about 0.4:0.6.

Figure 2:
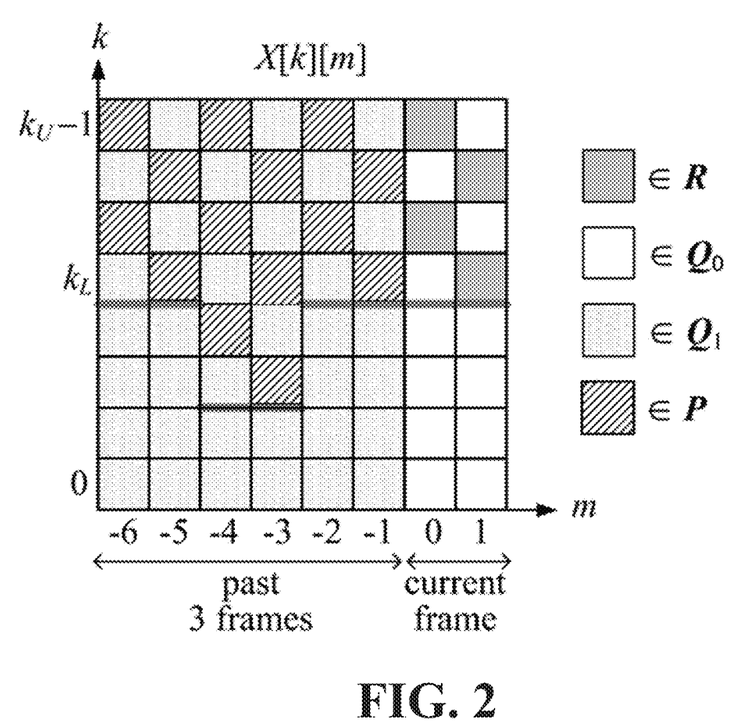
FIG. 2 illustrates a frequency spectral coefficient in a 2D check pattern in a frequency-time domain, according to an example embodiment of the inventive concept.

FIG. 2 illustrates matrix X[k][m]. The matrix X[k][m] indicates a frequency spectrum. Herein, 'm' denotes "−6≤m≤1" with respect to a varying $k_L$. Moreover, 'k' denotes $k_U$ at $U_x$ Hz, which is the given coding bandwidth. X[k][m] may be grouped into four exclusive sets. Set R indicates X[k][m], which is not transmitted to a decoder with respect to the current frame, from among the total X[k][m] in a 2D check pattern greater than $L_x$ Hz. When 'R' is recovered, which is the group of frequency spectral coefficients not transmitted to the decoder with respect to the current frame among the frequency spectral coefficients present in the 2D check pattern, the 2D check pattern secures the full use of 2D correlation in a time-frequency domain. Set $Q_0$ indicates X[k][m], which is transmitted to the decoder with respect to the current frame, from among the total X[k][m]. Furthermore, set $Q_1$ indicates X[k][m], which is transmitted to the decoder with respect to the past frame, from among the total X[k][m]. Moreover, T' indicates X[k][m], which is not transmitted to the decoder with respect to the past frame, from among the total X[k][m]. The encoder quantizes $Q_0$ through the normal transform coding for each frame and then transmits the quantized result to the decoder.

Also, the decoder recovers "|X[k][m]|∈R", which is the magnitude of X[k][m] corresponding to the subset of 'R', based on the union ($Q_0 \cup Q_1$) of $Q_0$ and $Q_1$ quantized by CNN. Because 'P' is contaminated by a recovery error, this may result in the low performance of the CNN in the case where the CNN is trained with the correct value of T'.

The inventive concept may utilize the CNN to recover the magnitude of the frequency spectrum, which is not transmitted from the encoder to the decoder. X[k][m] may be converted to Y[k][m], which is a new 2D matrix, to prepare the proper input to the CNN. This conversion process achieves 0≤k≤512 by reducing 'k' axis in half. Y[k][m] includes the result of deleting about half of the elements of the union ($Q_0 \cup Q_1$) of $Q_0$ and $Q_1$, which are lower than $L_x$ Hz, from among the elements of the union ($Q_0 \cup Q_1$) of $Q_0$ and $Q_1$. Even though partial useful information is lost in the union of $Q_0$ and $Q_1$ ($Q_0 \cup Q_1$), which is lower than $L_x$ Hz, Y[k][m] has the same structure at the situation, in which Y[k][m] is lower or greater than $L_x$ Hz, and has the same local relation in the whole region. Y[k][m] is an important condition required for local convolution operation in the CNN. Y[k][m] makes it possible to reduce the size of the neural network.

The input of the CNN is |Y[k][m]| satisfying "0≤k≤$k_L$/2, −6≤m≤1"; the output of the CNN is the recovered |X[k][m]| satisfying "0≤k≤$k_U$, m=0, 1". Herein, the recovered |X[k][m]| includes the elements of $Q_0$. The elements of 'R' is used as the final recovered data among the pieces of recovered |X[k][m]|; the elements of $Q_0$ may be replaced by the transmitted $Q_0$. In the input/output configuration of the CNN, different coding structures in the case of "$L_x$=3 kHz" and "$L_x$=4 kHz" are processed using the single CNN.

Figure 3:
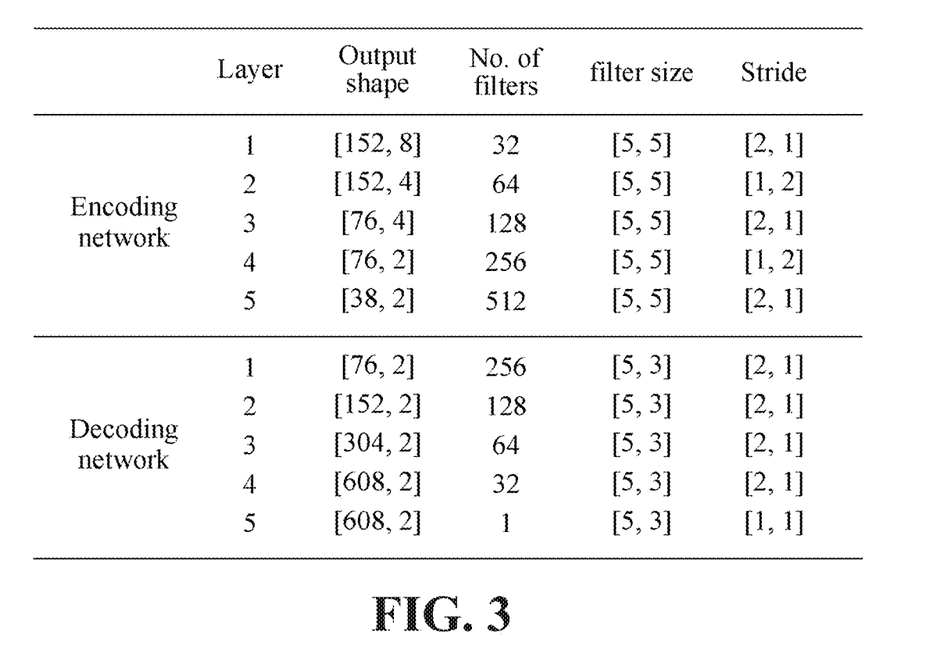
FIG. 3 is a view illustrating a CNN structure according to an example embodiment of the inventive concept.

When $U_x$ is 14.25 kHz and the sampling rate is 48 kHz, the CNN for frequency spectrum recovery is expressed as illustrated in FIG. 3. When the size is "304×8", the input of the CNN is |Y[k][m]| satisfying "0≤k≤304, −6≤m≤1".

The CNN consists of two regions: an encoding network and a decoding network.

The encoding network includes five layers; the encoding network encodes an input into "38×2" latent variables, using 2D convolution reducing the 2D output size and a rectified linear unit (ReLU) activation function. Moreover, the decoding network may also consist of five layers and may recover the output from the latent variables. The first four layers increase the output size by performing the 2D transpose convolution and the ReLU activation function; the last one layer outputs "608×2" pieces of data corresponding to |X[k][m]| satisfying "0≤k≤608, m=0, 1" by performing a tan h activation function.

The training process of CNN is performed without the quantization process of $Q_0$ and $Q_1$. This causes the inconsistency between the training process and the testing process of the CNN. However, the effect of the inconsistency is not significant. Also, the dependency of the neural network at a bitrate and the specific operation of respective encoder may be eliminated. The CNN may be trained through ADAM, using the L1 cost function and the minimum match size of 1024.

Figure 4:
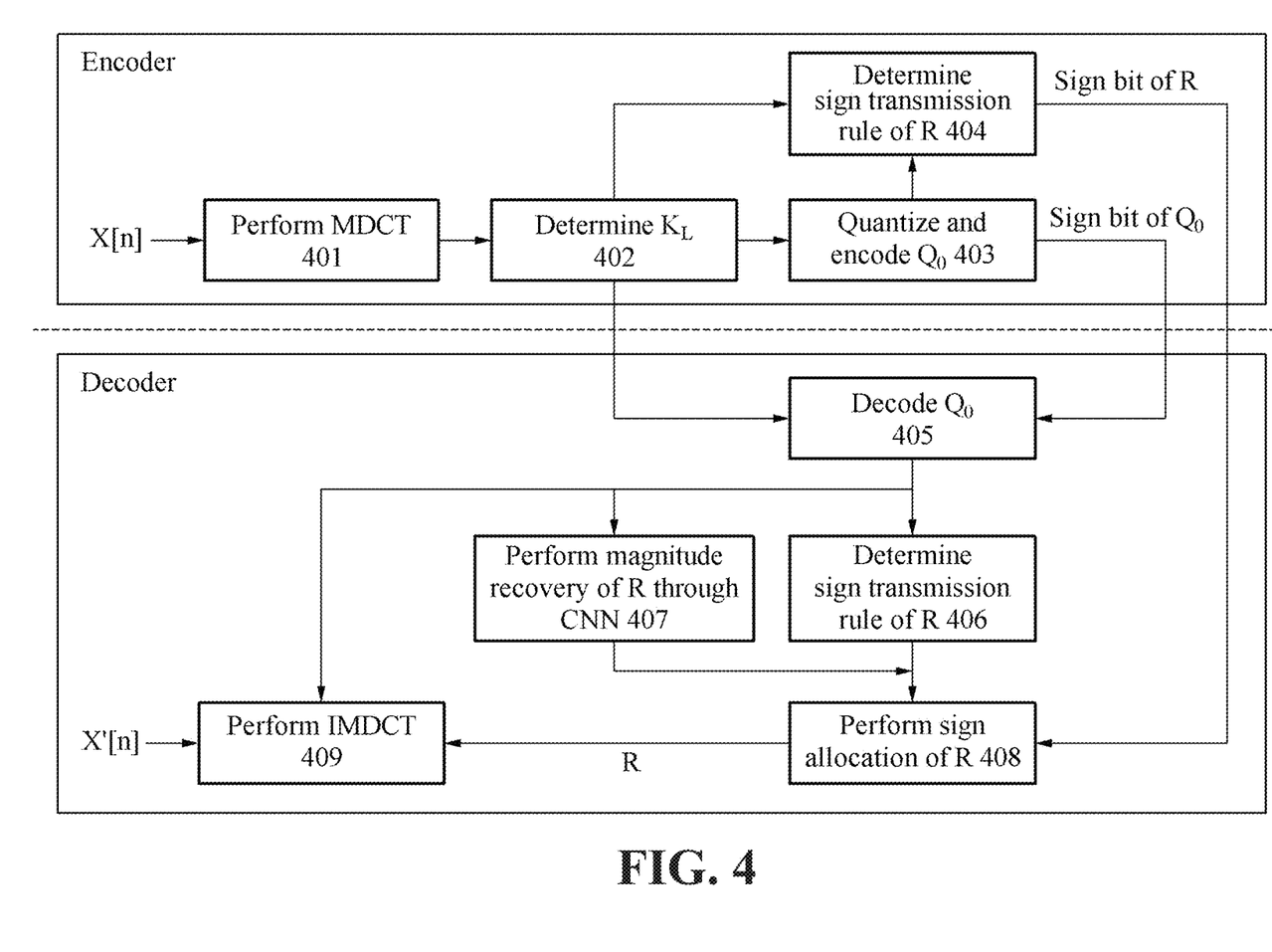
FIG. 4 is a view illustrating operations of an encoder and a decoder according to an example embodiment of the inventive concept.

FIG. 4 illustrates an audio coding method based on frequency spectrum recovery, according to an example embodiment of the inventive concept.

In operation 401, an encoder may perform MDCT, which is transform coding, on the input signal x[n]. As illustrated in FIG. 2, the frequency spectral coefficient in the time-frequency domain of the 2D check pattern may be determined through MDCT.

In operation 402, the encoder may determine $k_L$, which is a frequency index corresponding to the reference frequency $L_x$ for determining whether the CNN-based frequency spectrum recovery scheme is applied, as in the inventive concept.

In operation 403, the encoder may quantize and encode $Q_0$, which is the group of frequency spectral coefficients transmitted to a decoder with respect to the current frame among the frequency spectral coefficients present in the 2D check pattern. The quantization result of $Q_0$ is delivered to the decoder.

In the meantime, in operation 404, the encoder may determine a sign transmission rule for R, which is the group of frequency spectral coefficients not transmitted to the decoder with respect to the current frame among the frequency spectral coefficients present in the 2D check pattern. The encoder may selectively deliver a sign to the decoder with respect to a'. The sign transmission rule is described in detail with reference to FIG. 5.

Furthermore, in operation 405, the decoder may recover the $Q_0$ encoded by the encoder. Moreover, in operation 406, the decoder may determine a sign transmission rule for 'R', which is the group of frequency spectral coefficients not transmitted to the decoder with respect to the current frame among the frequency spectral coefficients present in the 2D check pattern.

In operation 407, the decoder may perform the magnitude recovery of 'R', using CNN. Afterward, the decoder may determine final a' by performing sign allocation of a' depending on the sign transmission rule determined in operation 406.

Next, in operation 408, the decoder may derive the recovered input signal x'[n] by performing IMDCT, which is transform coding, on $Q_0$ decoded through operation 405 and a' recovered through operation 408.

X[k][0] and X[k][1] are calculated by applying two MDCTs to x[n] of 2048 samples. $k_L$ is determined based on the band energy ratio for each frame. The quantization of $Q_0$ is performed through general transform coding based on subframe by calculating the scale factor of each subframe.

The frequency spectrum recovery-based audio coding has the time resolution and the frequency spectrum such as unified speech audio coding (USAC) having the frame of 2014 sample lengths, due to the independent quantization of $Q_0$ for each frame.

The entropy coding is applied to the quantum index of $Q_0$, and then the bit result of the entropy coding is transmitted. Instead of newly suggesting an optimized entropy coding for $Q_0$, the inventive concept may use arithmetic coding of USAC without considering the structural difference between the 2D time-frequency domain of the inventive concept and the 1D frequency spectrum domain in USAC.

Figure 6:
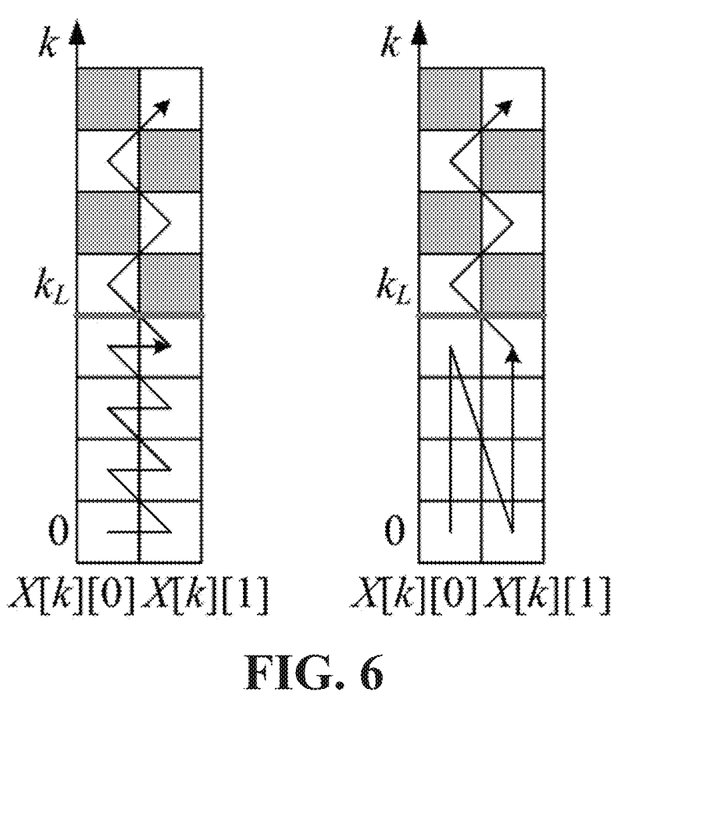
FIG. 6 illustrates a process of converting a 2D frequency spectral coefficient into 1D data for arithmetic coding, according to an example embodiment of the inventive concept.

Because the arithmetic coding in USAC uses 1D frequency spectrum data, as illustrated in FIG. 6, "X[k][m]∈R" is converted into 1D data by performing scanning pattern-up at $U_x$ Hz. As a result, the 1D quantization indexes may be entered into the USAC arithmetic coder. The scanning pattern having bits of a small number is selected. The state of the arithmetic coder is reset for each frame to switch the scanning pattern and $k_L$. The sign transmission rule of "X[k][m]∈R" is determined using the quantized $Q_0$ and then the sign is transmitted to the decoder.

The decoder recovers $Q_0$ through transform coding, using the transmitted $k_L$. The rule in which each of the transmitted signs is mapped to "X[k] [m]∈R" is determined based on $Q_0$. After |Y[k][m]| is set as an input, "X[k][m]∈R" is recovered by the CNN. The signs of the recovered "X[k] [m]∈R" are allocated, to the transmitted sign bits or randomly. Herein, the random allocation means that any value is determined as a sign. $Q_0$ and 'R' are transformed into x'[n] of 2048 samples, together.

The inventive concept proposes a 2D spectrum frequency recovery-based audio coding method using the CNN. In the inventive concept, the frequency spectral information in the 2D time-frequency domain is set by subframe-based MDCT, and a part of MDCT coefficients is transmitted to the decoder. On the other hand, the remaining MDCT coefficients not transmitted to the decoder are recovered at the decoder by the CNN. The signs of missing MDCT coefficients not transmitted to the decoder are transmitted depending on the importance or randomly allocated. Herein, the random allocation means that any value is determined as a sign.

Figure 5:
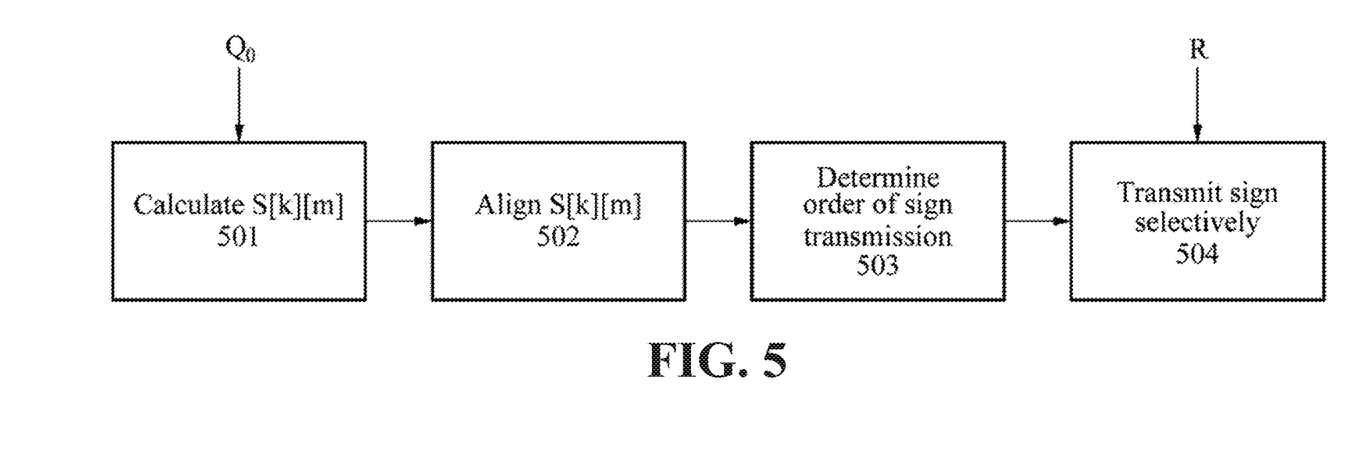
FIG. 5 is a diagram illustrating a process of determining a selective sign transmission rule according to an example embodiment of the inventive concept.

FIG. 5 is a diagram illustrating a process of determining a selective sign transmission rule according to an example embodiment of the inventive concept.

For the purpose of reducing the bit-rate in coding, it is necessary that the number of transmitted codes of a' be as small as possible. The inventive concept employs a selective sign transmission. The signs of "X[k] [m]∈R" corresponding to the subset of a' are selected more importantly than other signs and is transmitted in descending order, using 1 bit for each sign depending on the importance of the sign. As long as the sign importance of a' may be calculated in the encoder and decoder, the above-described process may be performed properly without any additional information.

The sign importance of X[k][m] is simply estimated by |X[k][m]|. However, the recovered "|X[k][m]|∈R" corresponding to the subset of a' may not be used. The reason is that the encoder and the decoder have different |X[k][m]| due to the numerical error in floating point calculation.

In the inventive concept, "X[k] [m]∈R" is replaced by the quantization value of "X[k][m]∈$Q_0$" adjacent to "X[k][m] ∈R". FIG. 5 illustrates the process of selective sign transmission. S[k][m] is "S[k][m]=|X[k−1][m]|+|X[k+1][m]| (X[k−1] [m]∈$Q_0$ and X[k+1][m]∈$Q_0$)" and calculated after quantization, with respect to "X[k][m]∈R". When pieces of S[k][m] with small 'k' and small 'm' are the same as one another, pieces of S [k] [m] are sorted in descending order. Pieces of $N_{sign}$ being the signs of pieces of X[k] [m] in a' corresponding to $N_{sign}$ being the sign of the largest S[k][m] are transmitted in order the same as S[k][m]. Because of the quantized $Q_0$, the encoder and the decoder determine the same order, assuming that there are no bit transmission errors. The signs not transmitted are randomly set by the decoder. This considers the intelligent gap filling (IGF) of MPEG-H. The missing signs of the MDCT coefficients are copied from the signs of other MDCT coefficients without significant quality degradation. The number of bits of the sign may be reduced in this way, and more important signs may be focused on being transmitted.

In the inventive concept, the number of signs $N_{sign}$ used when $L_x$ is 4 kHz may be 40; and the number of signs $N_{sign}$ used when $L_x$ is 3 kHz may be 100. When $L_x$ is 4 kHz, the correct sign is transmitted at 3 kHz to 4 kHz as the element of $Q_0$, and the small number of signs are used as compared with the case where $L_x$ is 3 kHz.

Figure 7:
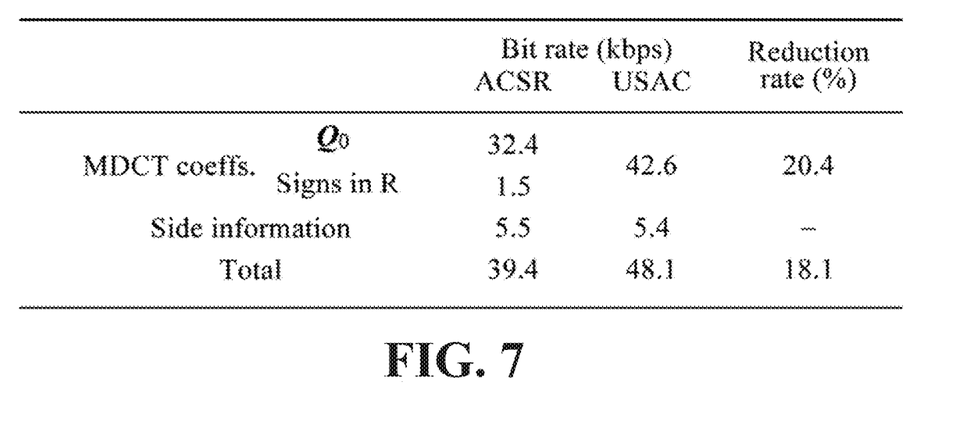
FIG. 7 is a view illustrating a comparison between effects of the inventive concept and USAC, according to an example embodiment of the inventive concept.

FIG. 7 illustrates the average number of coding bits for MDCT coefficients in the inventive concept (Audio Coding based on Spectral Recovery (ACSR)) and USAC when a frequency spectrum quantizer of USAC is used at 48 kbps and a bandwidth is set to $U_x$=14.25 kHz. With respect to the input of 2048 sample lengths, USAC has 1216 MDCT coefficients for "608×2" frames; the inventive concept has 736 MDCT coefficients for $Q_0$ when $L_x$ is 3 kHz and has 778 MDCT coefficients for $Q_0$ when $L_x$ is 4 kHz. That is, in the inventive concept, the number of coding bits is reduced by 20.4% as compared to USAC. Additional information such as a scale factor is processed based on a frame, and the number of bits is about the same.

In the meantime, a method according to an example embodiment of the inventive concept may be implemented as various recording media such as a magnetic storage medium, an optical read medium, and a digital storage medium after being implemented as a program that can be executed in a computer.

The implementations of the various technologies described in the specification may be implemented with a digital electronic circuit, computer hardware, firmware, software, or the combinations thereof. The implementations may be achieved using a computer program product, i.e., an information carrier, for example, a machine readable storage device (a computer-readable medium) or a computer program tangibly embodied in a radio signal, to process the operations of a data processing device, for example, a programmable processor, a computer, or a plurality of computers or to control the operations. The computer programs such as the above-described computer program(s) may be recorded in any form of a programming language including compiled or interpreted languages, and may be executed as a standalone program or in any form included as another unit suitable to be used in a module, component, sub routine, or a computing environment. The computer program may be executed to be processed on a single computer or a plurality of computers at one site or to be distributed across a plurality of sites and then interconnected by a communication network.

The processors suitable to process a computer program include, for example, both general purpose and special purpose microprocessors, and any one or more processors of a digital computer of any kind. Generally, the processor may receive instructions and data from a read only memory, a random access memory or both of a read only memory and a random access memory. The elements of a computer may include at least one processor executing instructions and one or more memory devices storing instructions and data. In general, a computer may include one or more mass storage devices storing data, such as a magnetic disk, a magneto-optical disc, or an optical disc or may be coupled with them so as to receive data from them, to transmit data to them, or to exchange data with them. For example, information carriers suitable to embody computer program instructions and data include semiconductor memory devices, for example, magnetic Media such as hard disks, floppy disks, and magnetic tapes, optical Media such as compact disc read only memory (CD-ROM), and digital video disc (DVD) magneto-optical media such as floppy disks, ROM, random access memory (RAM), flash memory, erasable programmable ROM (EPROM), electrically erasable programmable ROM (EEPROM), and the like. The processor and the memory may be supplemented by a special purpose logic circuit or may be included by the special purpose logic circuit.

Furthermore, the computer-readable medium may be any available medium capable of being accessed by a computer and may include both a computer storage medium and a transmission medium.

Although the specification includes the details of a plurality of specific implementations, it should not be understood that they are restricted with respect to the scope of any invention or claimable matter. On the contrary, they should be understood as the description about features that may be specific to the specific exemplary embodiment of a specific invention. Specific features that are described in this specification in the context of respective embodiments may be implemented by being combined in a single embodiment. On the other hand, the various features described in the context of the single embodiment may also be implemented in a plurality of embodiments, individually or in any suitable sub-combination. Furthermore, the features operate in a specific combination and may be described as being claimed. However, one or more features from the claimed combination may be excluded from the combination in some cases. The claimed combination may be changed to sub-combinations or the modifications of sub-combinations.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous. Moreover, the separation of the various device components of the above-described embodiments should not be understood as requiring such the separation in all embodiments, and it should be understood that the described program components and devices may generally be integrated together into a single software product or may be packaged into multiple software products.

According to an example embodiment of the inventive concept, it is possible to code audio signals with a better quality than the conventional audio coding scheme at the same bit-rate.

In the meantime, embodiments of the inventive concept disclosed in the specification and drawings are simply the presented specific example to help understand an embodiment of the inventive concept and not intended to limit the scopes of embodiments of the inventive concept. It is obvious to those skilled in the art that other modifications based on the technical idea of the inventive concept may be performed in addition to the embodiments disclosed herein.

What is claimed is:

1. A coding method of a frequency spectrum recovery scheme performed by an encoder, the method comprising:
   performing transform coding on an input signal;
   identifying a frequency spectral coefficient in a 2D check pattern derived through the transform coding;
   determining energy distribution information of a frequency spectral coefficient of the current frame;
   determining a reference frequency to which the coding method of the frequency spectrum recovery scheme is applied, using the energy distribution information;
   determining a first frequency spectral coefficient for a current frame to be transmitted to a decoder and a second frequency spectral coefficient for the current frame determined as not being transmitted to the decoder, among frequency spectral coefficients in the 2D check pattern, based on the reference frequency;
   coding the first frequency spectral coefficient to be transmitted to the decoder to transmit the coded first frequency spectral coefficient to the decoder; and
   selectively transmitting a sign of the second frequency spectral coefficient, which is determined as not being transmitted to the decoder, to the decoder.

2. The method of claim 1, wherein the sign of the second frequency spectral coefficient is sorted depending on importance of the sign to be selectively transmitted to the decoder.

3. The method of claim 1, wherein the first frequency spectral coefficient is quantized and encoded through arithmetic coding, and both a magnitude and a sign are transmitted to the decoder.

4. A decoding method of a frequency spectrum recovery scheme performed by a decoder, the method comprising:
   decoding a first frequency spectral coefficient transmitted from an encoder;
   recovering a magnitude of a second frequency spectral coefficient through a neural network based on a quantized first frequency spectrum respect to the current time and the past time;
   determining a sign transmission rule of a second frequency spectral coefficient, which is not transmitted by the encoder;
   allocating a sign of the second frequency spectral coefficient depending on the sign transmission rule; and
   performing inverse transform coding on the first frequency spectral coefficient and a second frequency spectrum, of which the sign and the magnitude are determined, to output a recovered input signal,
   wherein the first frequency spectral coefficient is a frequency spectrum transmitted to the decoder, among frequency spectral coefficients in a 2D check pattern derived by performing transform coding on an input signal in the encoder, and wherein the second frequency spectral coefficient is a frequency spectrum not transmitted to the decoder, among the frequency spectral coefficients in the 2D check pattern derived by performing the transform coding on the input signal in the encoder.

5. The method of claim 4, wherein the sign of the second frequency spectral coefficient is sorted depending on importance of the sign to be selectively transmitted by the encoder, and wherein the allocating of the sign includes:
allocating the transmitted sign to the second frequency spectral coefficient; and
allocating the sign, which is not transmitted, to the second frequency spectral coefficient randomly.

6. The method of claim 4, wherein the decoding of the first frequency spectral coefficient includes:
decoding the first frequency spectral coefficient based on arithmetic decoding.

7. The method of claim 4, wherein the neural network is trained by receiving a frequency spectral coefficient, in which a frequency index is reduced, in a 2D check pattern of a time-frequency domain.

8. The method of claim 7, wherein an input of the neural network is a result of deleting elements lower than a reference frequency among elements of a union of a first frequency index coefficient for a current frame, which is transmitted to the decoder in the 2D check pattern of the time-frequency domain, and a frequency index coefficient of a past frame.

9. A decoder performing a decoding method of a frequency spectrum recovery scheme, the decoder comprising:
a processor,
wherein the processor is configured to:
decode a first frequency spectral coefficient transmitted from an encoder;
recover a magnitude of a second frequency spectral coefficient through a neural network based on a quantized first frequency spectrum respect to the current time and the past time;
determine a sign transmission rule of a second frequency spectral coefficient, which is not transmitted by the encoder;
allocate a sign of the second frequency spectral coefficient depending on the sign transmission rule; and
perform inverse transform coding on the first frequency spectral coefficient and a second frequency spectrum, of which the sign and the magnitude are determined, to output a recovered input signal,
wherein the first frequency spectral coefficient is a frequency spectrum transmitted to the decoder, among frequency spectral coefficients in a 2D check pattern derived by performing transform coding on an input signal in the encoder, and
wherein the second frequency spectral coefficient is a frequency spectrum not transmitted to the decoder, among the frequency spectral coefficients in the 2D check pattern derived by performing the transform coding on the input signal in the encoder.

10. The decoder of claim 9, wherein the sign of the second frequency spectral coefficient is sorted depending on importance of the sign to be selectively transmitted to the encoder, and wherein the allocating of the sign includes:
allocating the transmitted sign to the second frequency spectral coefficient; and allocating the sign, which is not transmitted, to the second frequency spectral coefficient randomly.

11. The decoder of claim 9, wherein the processor is configured to:
decode the first frequency spectral coefficient based on arithmetic decoding.

12. The decoder of claim 9, wherein the neural network is trained by receiving a frequency spectral coefficient, in which a frequency index is reduced, in a 2D check pattern of a time-frequency domain.

13. The decoder of claim 12, wherein an input of the neural network is a result of deleting elements lower than a reference frequency among elements of a union of a first frequency index coefficient for a current frame, which is transmitted to the decoder in the 2D check pattern of the time-frequency domain, and a frequency index coefficient of a past frame.

* * * * *